United States Patent
Zhu et al.

(10) Patent No.: US 9,318,893 B2
(45) Date of Patent: Apr. 19, 2016

(54) ISOLATED BATTERY MANAGEMENT SYSTEMS AND METHODS THEREOF

(71) Applicant: GENERAL ELECTRIC COMPANY, Schenectady, NY (US)

(72) Inventors: Huibin Zhu, Westford, MA (US); Hua Zhou, Mount Pleasant, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 449 days.

(21) Appl. No.: 13/949,567

(22) Filed: Jul. 24, 2013

(65) Prior Publication Data

US 2015/0028672 A1  Jan. 29, 2015

(51) Int. Cl.
| | |
|---|---|
| G05F 3/06 | (2006.01) |
| H02J 1/00 | (2006.01) |
| G06F 1/26 | (2006.01) |
| H02J 1/06 | (2006.01) |
| H02J 1/10 | (2006.01) |
| H02J 7/34 | (2006.01) |
| H02M 3/335 | (2006.01) |

(52) U.S. Cl.
CPC ... *H02J 1/00* (2013.01); *G06F 1/26* (2013.01); *H02J 1/06* (2013.01); *H02J 1/10* (2013.01); *H02J 7/34* (2013.01); *H02J 2001/008* (2013.01); *H02M 3/335* (2013.01); *Y10T 307/406* (2015.04)

(58) Field of Classification Search
CPC ......... H02J 1/00; H02J 2001/008; H02J 7/34; G06F 1/26; Y10T 307/406
USPC ....................................................... 307/151
See application file for complete search history.

(56) References Cited

U.S. PATENT DOCUMENTS

| | | | |
|---|---|---|---|
| 5,527,637 | A | 6/1996 | Nakazawa et al. |
| 2005/0094330 | A1 | 5/2005 | Guenther et al. |
| 2005/0151513 | A1 | 7/2005 | Cook et al. |
| 2008/0291879 | A1 | 11/2008 | Duff et al. |
| 2010/0142195 | A1 | 6/2010 | Hoffman |
| 2010/0266875 | A1* | 10/2010 | Somogye ................. G05F 1/10 429/7 |
| 2011/0296218 | A1 | 12/2011 | Kim et al. |
| 2012/0139477 | A1 | 6/2012 | Oglesbee et al. |

(Continued)

FOREIGN PATENT DOCUMENTS

| | | |
|---|---|---|
| EP | 1962407 A2 | 8/2008 |
| JP | 07087601 A | 3/1995 |

(Continued)

OTHER PUBLICATIONS

Unofficial English Translation of Japanese Office Action issued in connection with corresponding JP Application No. 2014148432 on Jun. 16, 2015.

(Continued)

*Primary Examiner* — Jared Fureman
*Assistant Examiner* — Duc M Pham
(74) *Attorney, Agent, or Firm* — Dority & Manning, PA (57) ABSTRACT

Systems and methods of the invention relate to circuitry that isolates low power circuitry of a battery management system. One or more circuits can be utilized with a battery management system to provide isolation of low power circuitry from at least one of a high voltage, noise interference from a battery, noise interference from a high voltage, sensor signals, control signals, among others. The circuitry further provides high voltage from a grid to be stepped-down to a voltage level usable by circuitry, port(s), and/or a processor.

20 Claims, 6 Drawing Sheets

(56) References Cited

U.S. PATENT DOCUMENTS

| | | | | |
|---|---|---|---|---|
| 2013/0023943 A1* | 1/2013 | Parramon | A61N 1/3787 | 607/2 |
| 2013/0106195 A1* | 5/2013 | Kusch | H02J 7/1423 | 307/82 |
| 2013/0234667 A1* | 9/2013 | Norton | H01M 10/441 | 320/122 |
| 2015/0251559 A1* | 9/2015 | Chauvelier | B60L 11/1868 | 307/9.1 |

FOREIGN PATENT DOCUMENTS

| WO | 2009131336 A2 | 10/2009 |
|---|---|---|
| WO | 2010051984 A2 | 5/2010 |
| WO | 2010103182 A2 | 9/2010 |

OTHER PUBLICATIONS

European Search Report issued in connection with corresponding EP Application No. 14177828.2 dated.

\* cited by examiner

ISOLATED BATTERY MANAGEMENT SYSTEMS AND METHODS THEREOF

BACKGROUND

1. Technical Field

Embodiments of the subject matter disclosed herein relate to battery management circuitry designs.

2. Discussion of Art

Battery management systems can include various components, circuitry, hardware, and the like. Battery management systems often have high-pot failures, signal noises, sensor noises, inverter grounding interference, and voltage leakage. Conventional battery systems use a processor that uses signals comingled with noise or other interferences that can affect performance.

It may be desirable to have a system and method that differs from those systems and methods that are currently available.

BRIEF DESCRIPTION

In an embodiment, a system is provided that includes a first circuit that is configured to convert a first voltage of a DC bus to a lower second voltage and isolate the second voltage from the first voltage. The system further includes at least one of a third circuit or a fourth circuit. The third circuit is operatively connected to an output of the first circuit and configured to convert the second voltage to a lower fourth voltage, isolate the fourth voltage from the second voltage, and condition at least a first monitoring signal related to a battery module to form a first conditioned monitoring signal. At least a signal conditioning portion of the third circuit is powered by the fourth voltage. The fourth circuit is operatively connected to the output of the first circuit and is configured to convert the second voltage to a lower fifth voltage, isolate the fifth voltage from the second voltage, and condition at least a second monitoring signal related to the battery module to form a second conditioned monitoring signal. At least a signal conditioning portion of the fourth circuit is powered by the fifth voltage. The system further includes a processor that is configured to receive at least the first conditioned monitoring signal or the second conditioned monitoring signal.

In an embodiment, a method is provided that includes at least the following steps: receiving a DC bus voltage from a power grid; reducing the DC bus voltage from a first voltage to an isolated second voltage; reducing the second voltage to at least one of an isolated third voltage or an isolated fourth voltage; reducing the second voltage to an isolated fifth voltage; conditioning a monitored battery signal related to a battery module to form a conditioned battery signal using the fifth voltage; communicating the conditioned battery signal to a processor; and controlling an operation of the battery module with the processor in response to the conditioned battery signal.

In an embodiment, a system is provided that includes a first circuit configured to convert a first voltage of a DC bus to a lower, isolated second voltage. The system includes at least one of a third circuit or a fourth circuit. The third circuit is operatively connected to an output of the first circuit and configured to convert the second voltage to a lower, isolated fourth voltage and to condition at least a first monitoring signal related to a battery module to form a first conditioned monitoring signal. At least a signal conditioning portion of the third circuit is powered by the fourth voltage. The fourth circuit is operatively connected to the output of the first circuit and configured to convert the second voltage to a lower, isolated fifth voltage and to condition at least a second monitoring signal related to the battery module to form a second conditioned monitoring signal. At least a signal conditioning portion of the fourth circuit is powered by the fifth voltage. The system can further include means for communicating at least the first conditioned monitoring signal or the second conditioned monitoring signal to a processor of a battery management system.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Conventionally, a battery management system used flayback power supply topology in which sensor circuits were not isolated from a processor. These conventional systems provided high voltage risks to other devices or interface circuits tied to the controller based on connectivity of high voltage to the controller. Moreover, conventional port(s) for programming, communicating, debugging, among others were also tied to high voltage which provided a touch hazard that could harm individuals operating with the port(s). Conventional battery management systems further include grounding interference issues with other equipment in inverter power systems. These conventional battery management systems included a grounding path that tied to a chassis and caused grounding fault protection tripping from inverter or other equipment in the battery management system. Additionally, hipot tests would provide a false positive due to grounding leakage current (e.g., current interference). Conventional battery management systems further introduced noise from sensing circuits due to common-node coupling which affects sensing and ultimately control from a processor. The subject innovation provides a battery management system that is highly isolated and mitigates issues of conventional battery management systems.

The systems disclosed herein provide isolation for battery management system power supply as well as for sensing signals and/or control signals. The systems described herein increase reliability, reduce noise, and allow for grounded or ungrounded inverter power. The following is provided by the systems: reliable circuits due to isolation; conditioned circuits from isolated sensing circuits; grounded or ungrounded inverter power system scheme; increase consistency for hipot test; increased debugging efficiency; or increased efficiency with scaling a battery management system.

Embodiments of the invention relate to methods and systems for circuitry that isolates low power circuitry of a battery management system. One or more circuits can be utilized with a battery management system to provide isolation from at least one of a high voltage, noise interference from a battery, noise interference from a high voltage, sensor signals, control signals, among others. The circuitry further provides high voltage from a grid (e.g., AC grid) to be stepped-down to a voltage level usable by circuitry, port(s), and/or a processor that controls the battery management system.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof A portion of hardware can include at least a processor and a portion of memory, wherein the memory includes an instruction to execute. "Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like. "Computer" "processor" or "processing element" or "computer device" as used herein includes, but is not limited to, a programmed or programmable electronic device that can store, retrieve, and process data. "Non-transitory computer-readable media" include, but are not limited to, a CD-ROM, a removable or non-removable flash memory card, a hard disk drive, a magnetic tape, and a floppy disk. "Computer memory", as used herein, refers to a storage device configured to store digital data or information which can be retrieved by a computer or processing element. "Controller", as used herein, refers to the logic circuitry and/or processing elements and associated software or program involved in controlling an energy storage system or battery management system. The terms "signal", "data", and "information" may be used interchangeably herein and may refer to digital or analog forms. A "hipot" test is defined as a verification of an insulation of a product or component to prevent electric shock or electric leakage. A hipot test can also be referred to as a Dielectric Withstanding Voltage (DWV) test.

Figure 1:
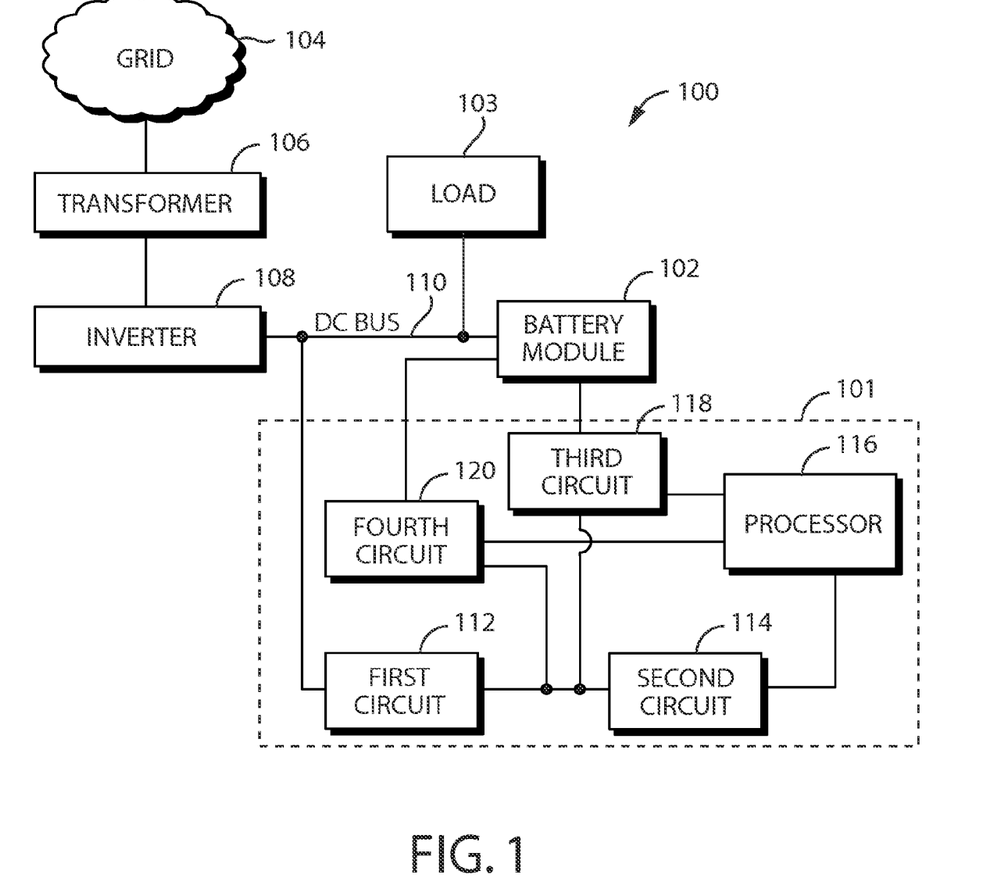
FIG. 1 is an illustration of a block diagram of an embodiment of a battery management system that controls a battery module that powers a load when a grid is not operative.

FIGS. 1-5 illustrate circuitry for a battery management system that provides isolation for a portion of low power circuitry of a battery management system 101. Turning to FIG. 1, a system 100 is illustrated that includes a power grid 104 (referred herein as grid 104) from which a transformer 106 and an inverter 108 provide a DC voltage to a DC bus 110. It is to be appreciated that the grid can be an AC grid. The DC bus can include a positive polarity and a negative polarity (depicted in FIGS. 2 and 5). The DC bus is used to supply voltage to a battery module 102 and a load 103. The grid is used to power the load unless the grid is not operative in which case the battery module 102 powers the load. The system includes circuits that isolate high voltage on the DC bus from the processor as well as isolation for control signals, sensor signals, among others. The battery module can include an "X" number of batteries, where "X" is a positive integer. For instance, each battery can include one or more respective signals related thereto (e.g., battery voltage signal, mid-battery voltage signal, and the like). Moreover, the system can include a processor 116 that is incorporated into the battery management system (as depicted), a stand-alone component, and/or a combination thereof.

Figure 3:
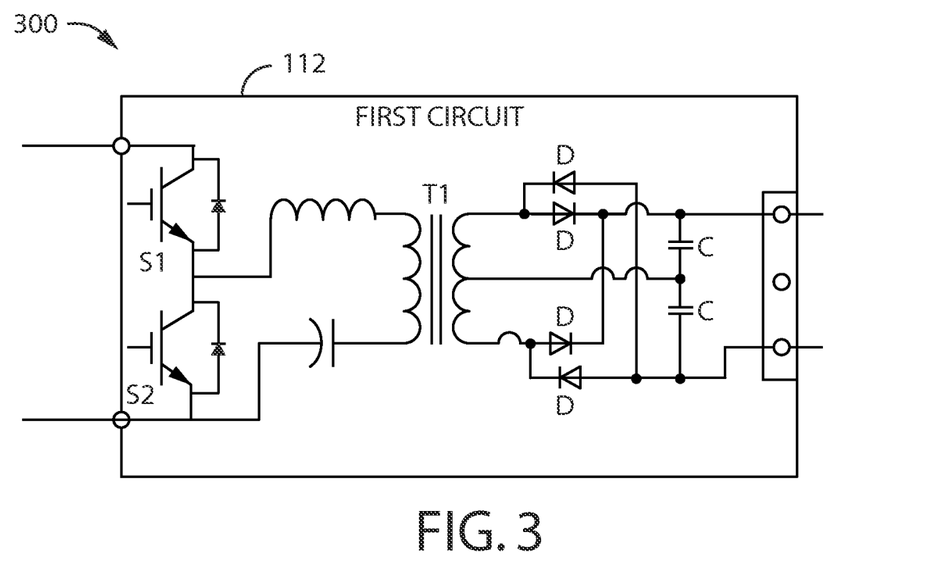
FIG. 3 is an illustration of an embodiment of a circuit for reducing a DC bus voltage to a lower, isolated voltage.

The system includes first circuit 112 that isolates and converts (e.g., reduces) a voltage (first voltage) from the DC bus to a lower voltage (e.g., second voltage). For instance, the first circuit can be an isolation step down DC to DC converter circuit as depicted in FIG. 3 (discussed below). By way of example and not limitation, the first circuit can isolate and convert an approximate 600 volts from the DC bus to approximately 24 volts. Furthermore, the first circuit can be incorporated into a battery management system, a stand-alone circuit separate from a battery management system, or a combination thereof.

Figure 4:
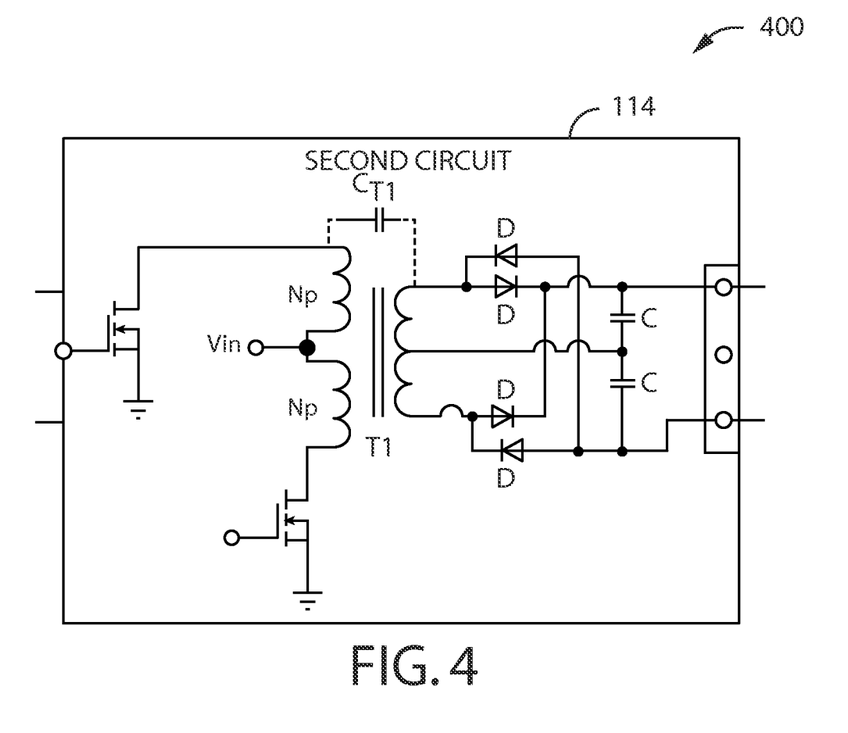
FIG. 4 is an illustration of an embodiment of a circuit for reducing and isolating a voltage.

The system further includes a second circuit 114 that isolates and converts (e.g., reduces) the second voltage to a third voltage, wherein the third voltage is lower than the second voltage. In an embodiment, the second circuit isolates and converts the second voltage into the third voltage and an additional voltage, wherein the additional voltage is lower than the third voltage. In particular, the third voltage can be utilized by the processor or at least one auxiliary port 204 (shown in FIG. 2). By way of example and not limitation, the third voltage can be approximately 5 volts or approximately 3.3 volts. For instance, the 5 volts can be used by the at least one port and the 3.3 volts can be used by the processor. Furthermore, the second circuit can be an isolation step down DC to DC converter circuit as depicted in FIG. 4. In an embodiment, the second circuit can be grounded to a chassis (not shown) of the battery module.

The second voltage can be utilized by at least one of a third circuit 118 or a fourth circuit 120. In an embodiment, the third circuit can be associated with a negative polarity of the DC bus (e.g., a negative current bus signal from the DC bus) and the fourth circuit can be associated with a positive polarity of the DC bus (e.g., a positive current bus signal from the DC bus). Moreover, the third circuit and the fourth circuit can condition a monitoring signal related to the battery module and provide the conditioned monitoring signal to the processor. By way of example and not limitation, conditioning can relate to a filtering of a signal, a noise reduction of a signal, isolation of a signal, and the like. For instance, a conditioning of a signal can be performed by, but not limited to, an optical coupler, a transformer, among others. The third circuit can condition a first monitoring signal related to the battery module and provide a first conditioned monitoring signal (utilized by the processor). The fourth circuit can condition a second monitoring signal related to the battery module and provide a second conditioned monitoring signal (utilized by the processor). It is to be appreciated that the third circuit and/or the fourth circuit can condition a number of monitoring signals related the battery module. For instance, the first monitoring signal and/or the second monitoring signal can be from the battery module (e.g., battery voltage signal 526, mid-battery voltage signal 524, signal from RTD 518, signal from RTD 520, among others), related to a battery within the battery module, related to a DC bus, among others.

In an embodiment, the third circuit can isolate and convert the second voltage to a fourth voltage, wherein the third circuit is powered by the fourth voltage to provide signal conditioning. For example, the fourth voltage can be approximately 5 volts. In an embodiment, the fourth circuit can isolate and convert the second voltage to a fifth voltage, wherein the fourth circuit is powered by the fifth voltage to provide signal conditioning. For instance, the fifth voltage can be approximately 5 volts. It is to be appreciated that there can be more than one of the third circuit and/or more than one of the fourth circuit (See FIG. 6). In an embodiment, the number of the third circuit(s) and/or the fourth circuit(s) can be based on, for instance, a monitoring signal to condition for the processor.

Based on the employment of the first circuit, second circuit, third circuit, and fourth circuit, various layers of isolation are provided. In an embodiment, the processor is isolated from the high voltage from the DC bus. The monitoring signal(s) related to the battery module are conditioned prior to being communicated and/or used by the processor. The high voltage of the DC bus is isolated based on the positive polarity being associated with the fourth circuit and the negative polarity being associated with the third circuit, wherein the third circuit and the fourth circuit are isolated from the processor. The second circuit isolates and provides voltage to the processor by isolating the voltage input from the first circuit. The second circuit isolates power supplied to the processor and the port(s), wherein the processor is also isolated and separate from the port(s).

The subject innovation provides a grounding to either the positive (+) polarity of the DC bus 110 or the negative (−) polarity of the DC bus 110. Conventional techniques required a grounding of all components or elements to the negative polarity of the DC bus 110. In the systems and method provided herein, high voltages can be grounded and separated (e.g., isolated) from lower voltages. For instance, the ground for the processor is isolated from the ground used for the third circuit and/or the fourth circuit. In an embodiment, the processor can include a digital ground and the other circuits can include an analog ground. Moreover, noise from the battery management system can be isolated from one or more ports 204.

Figure 2:
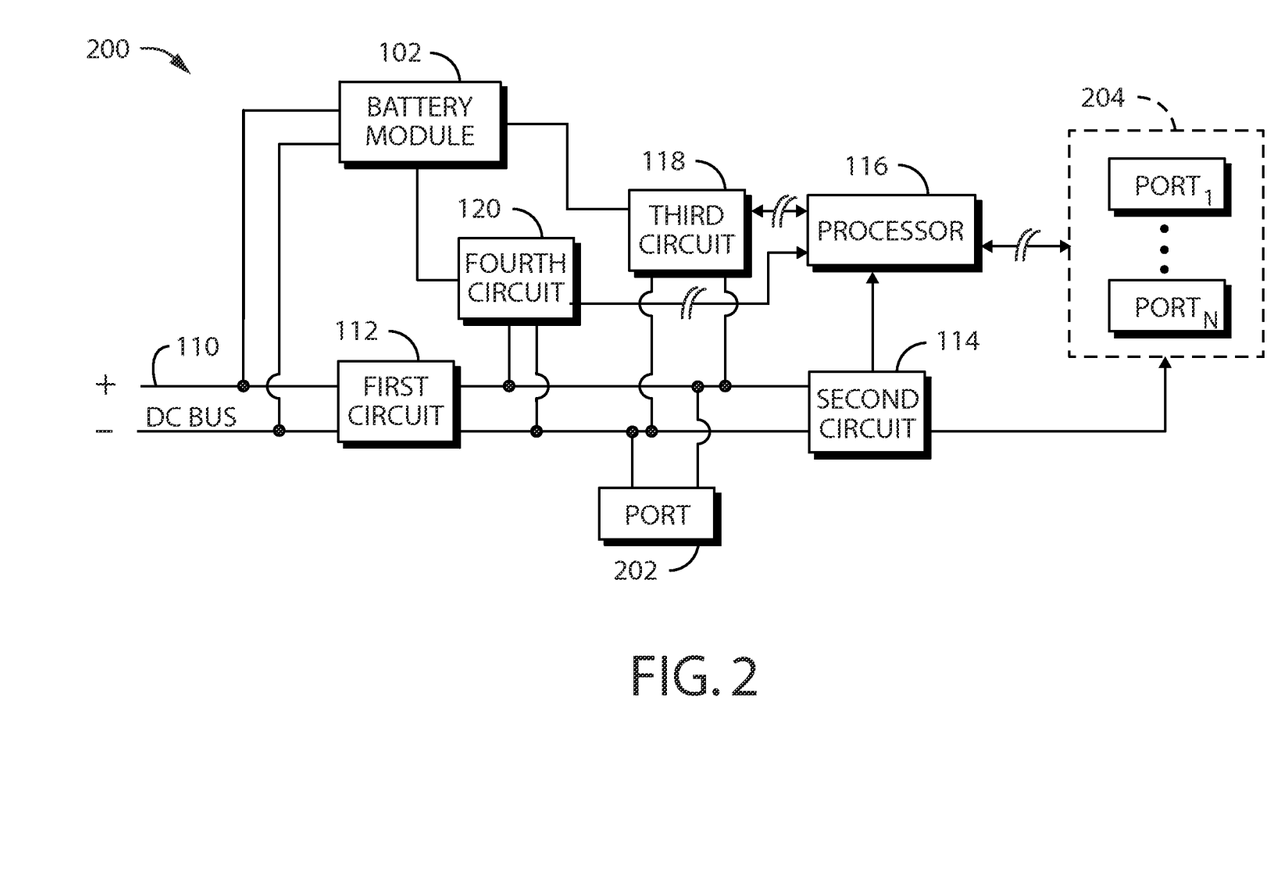
FIG. 2 is an illustration of an embodiment of a circuit for reducing a DC bus voltage to a lower, isolated voltage.

Turning to FIG. 2, a system 200 illustrates the DC bus used as a source of power for battery management. As discussed above, the third voltage can be used to supply power to the processor. In addition to the third voltage, the second circuit can isolate and convert the second voltage to an additional voltage that powers at least one port. It is to be appreciated that there can be any suitable number of ports such as port$_1$ to port$_N$, where "N" is a positive integer. By way of example and not limitation, the port can be a fan control, a Controller Area Network (CAN) box, an Ethernet port, a programming port, a communications port, a debug port, an RS-232 port, an RS-485 port, among others.

The system 200 can include an auxiliary port 202 that can supply a sixth voltage to the second circuit, the third circuit, and/or the fourth circuit, wherein the sixth voltage is approximate to the second voltage. For example, the sixth voltage can be approximately 24 volts. In an embodiment, the auxiliary port is operatively connected to a battery (not shown) to supply 24 volts.

FIG. 3 illustrates a circuitry 300 for the first circuit 112. It is to be appreciated that the first circuit configuration is an example and that variation of the circuit is to be considered within the scope of the subject innovation. In general, the first circuit can isolate and convert or step-down a voltage from a first voltage to a second voltage, wherein the first voltage is greater than the second voltage. By way of example and not limitation, the circuitry 300 can include a first switch, a second switch, an inductor, a capacitor (e.g., polarized capacitor, electrolytic capacitor, and the like), a transformer, diodes, a resistor, a capacitor, among others. The configuration of the components in the circuitry 300 can be a combination in various manners such that voltage input is stepped down to provide a lower voltage output, wherein such conversion is isolated.

FIG. 4 illustrates a circuitry 400 for the second circuit 114. It is to be appreciated that the second circuit configuration is an example and that variation of the circuit is to be considered within the scope of the subject innovation. In general, the second circuit can isolate and convert or step-down a voltage from a second voltage to a third voltage, wherein the second voltage is greater than the third voltage. In another example, the second circuit can convert the second voltage into the third voltage and an additional voltage, wherein the second voltage is greater than the third voltage and the additional voltage. In particular, the third voltage or the additional voltage can be utilized by the processor or at least one auxiliary port. By way of example and not limitation, the third voltage or the additional voltage can be approximately 5 volts or approximately 3.3 volts. By way of example and not limitation, the circuitry 400 can include a transformer, an inductor, a capacitor (e.g., polarized capacitor, electrolytic capacitor, inverted capacitor, and the like), diodes, resistors, among others. The configuration of the components in the circuitry 400 can be a combination in various manners such that voltage input is stepped down to provide a lower voltage output, wherein such conversion is isolated. The second circuit can be grounded to a chassis of a battery management system or housing (not shown).

Figure 5:
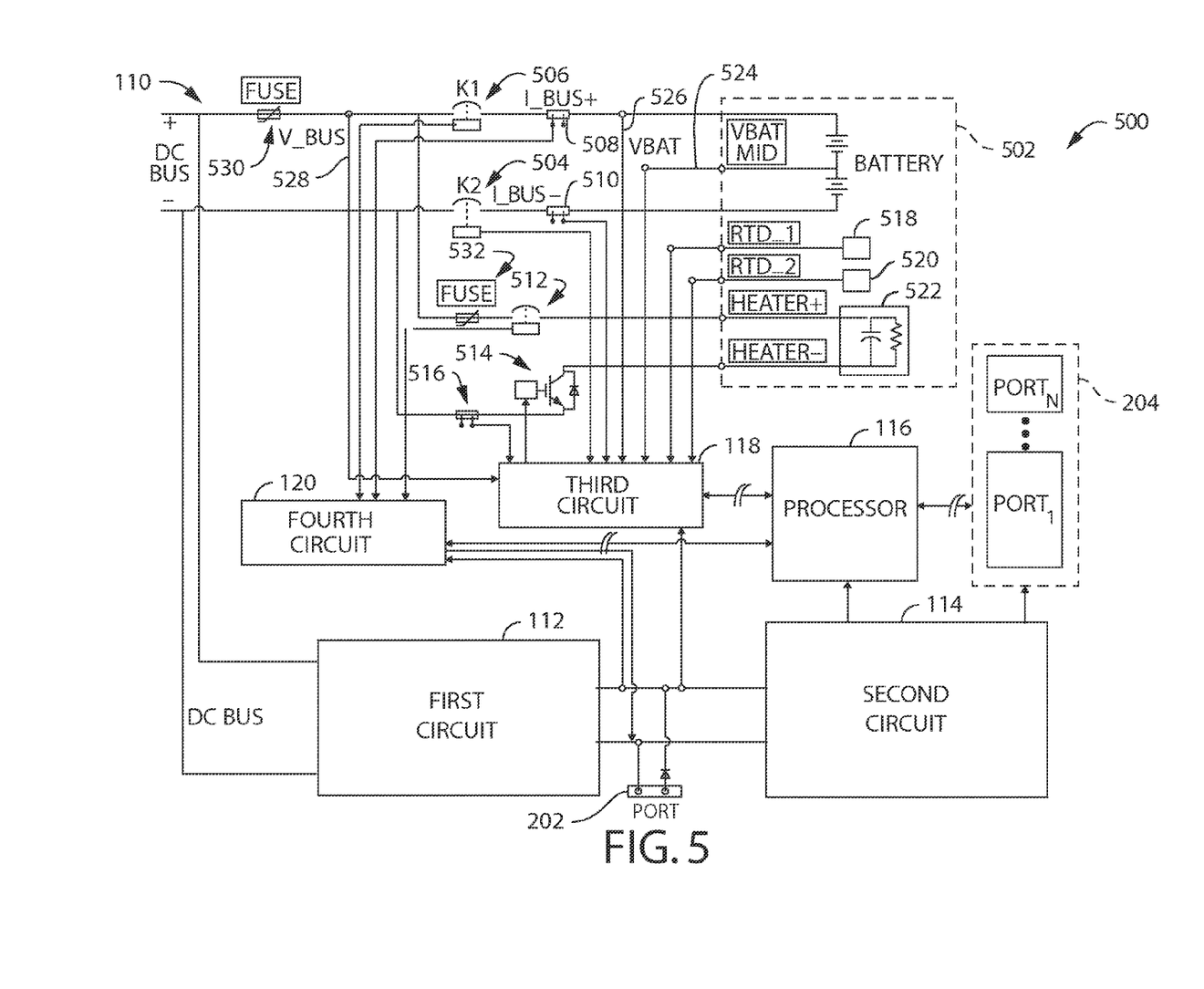
FIG. 5 is an illustration of an embodiment of a circuit for isolating low power circuitry of a battery management system.

Turning to FIG. 5, a system 500 illustrates one or more circuits for isolating low power circuitry of a battery management system. The system can include a battery module 502, a contactor 504 (K2) for a negative polarity of the DC bus, a contactor 506 (K1) for the positive polarity of the DC bus, a shunt 508 (i_bus+) for a positive polarity of the DC bus, a shunt 510 (i_bus−) for a negative polarity of the DC bus, a contactor 512 for a heater 522 of the battery module in which the contactor is for a positive polarity of the DC bus, a switch 514 for the heater, a shunt 516 for the heater on the negative polarity of the DC bus, a first Resistance Temperature Detector (RTD) 518, a second Resistance Temperature Detector (RTD) 520, a fuse 532 for a positive polarity of the DC bus, a fuse 530 for a positive polarity of the DC bus, among others. It is to be appreciated that the battery module and the components (e.g., contactor 504, contactor 506, shunt 508, shunt 510, contactor 512, heater 522, switch 514, shunt 516, first RTD 518, second RTD 520, fuse 532, fuse 530, and the like) is one of various configurations and such variations are to be included within the scope of the subject innovation. It is to be appreciated that the system 500 can include analog-to-digital conversion circuitry to provide a compatible signal to the processor.

The third circuit and the fourth circuit can condition any suitable number of signals, wherein the signals can be assigned to one of the circuits based on a criteria. It is to be appreciated that the third circuit and/or the fourth circuit can include those elements, circuits, sub-circuits, or sub-elements specified therein, some of the specified elements, circuits, sub-circuits, or sub-elements, and/or additional elements or circuits. Further yet, one or more elements, circuits, sub-circuits, and/or sub-elements may be combined into a single component to provide aggregate functionality. The elements or circuits may also interact with one or more other elements not specifically described herein. The configuration discussed below is related to signal conditioning with the third circuit and the fourth circuit is solely for example and any assignment of signal conditioning by the third circuit or the fourth circuit can be employed.

The third circuit can condition a first monitoring signal to provide a first conditioned monitoring signal, wherein the first monitoring signal is used by the processor to control at least one of the battery, a portion of the battery management system, a heater, a contactor, among others. By way of example and not limitation, the first monitoring signal can be a positive polarity DC bus voltage signal, a positive polarity battery voltage signal (via positive polarity voltage 526) from the battery module, a mid-battery voltage signal (via mid-battery voltage 524) from the battery module, a Resistance Temperature Detector (RTD) signal from the battery module (via RTD 518 or RTD 520), a battery heater shunt signal (via shunt 516), a positive polarity contactor signal (via contactor 506), a DC bus voltage signal of the positive polarity (via the DC positive polarity bus 528), a negative polarity contactor signal (via contactor 504), among others. Additionally, the third circuit can provide control (e.g., a signal, a voltage, etc.) to the switch 514 to activate or deactivate the heater under control of the processor.

The fourth circuit can condition a second monitoring signal to provide a second conditioned monitoring signal, wherein the second monitoring signal is used by the processor to control at least one of the battery, a portion of the battery management system, a heater, a contactor, among others. By way of example and not limitation, the second control signal can be a positive polarity DC bus voltage signal (via the DC positive polarity bus 528), a positive polarity battery voltage signal from the battery module (via battery voltage 526), a mid-battery voltage signal from the battery module (via mid-battery voltage 524), a Resistance Temperature Detector (RTD) signal from the battery module (via RTD 518 or RTD 520), a battery heater shunt signal (via shunt 516), a positive polarity contactor signal (via contactor 512), a negative polarity contactor signal (via contactor 504), a positive polarity contactor signal (via contactor 506), among others. In another embodiment, the first monitored signal for the third circuit can be the negative current signal via shunt 510 and the second monitored signal for the fourth circuit can be the positive current signal via shunt 508.

In a particular example, the third circuit conditions a signal from the shunt 510 associated with the negative polarity of the DC bus (e.g., negative current bus signal from the DC bus) and the fourth circuit conditions a signal from the shunt 508 associated with the positive polarity of the DC bus (positive current bus signal from the DC bus). Based on such a separation of the negative polarity of the DC bus and the positive polarity of the DC bus, each current can be measured. In an embodiment, the third circuit is associated with a negative side of the DC bus, the fourth circuit is associated with a positive side of the DC bus, the first monitoring signal is a monitored negative current bus signal from the DC bus, and the second monitoring signal is a monitored positive current bus signal from the DC bus.

Figure 6:
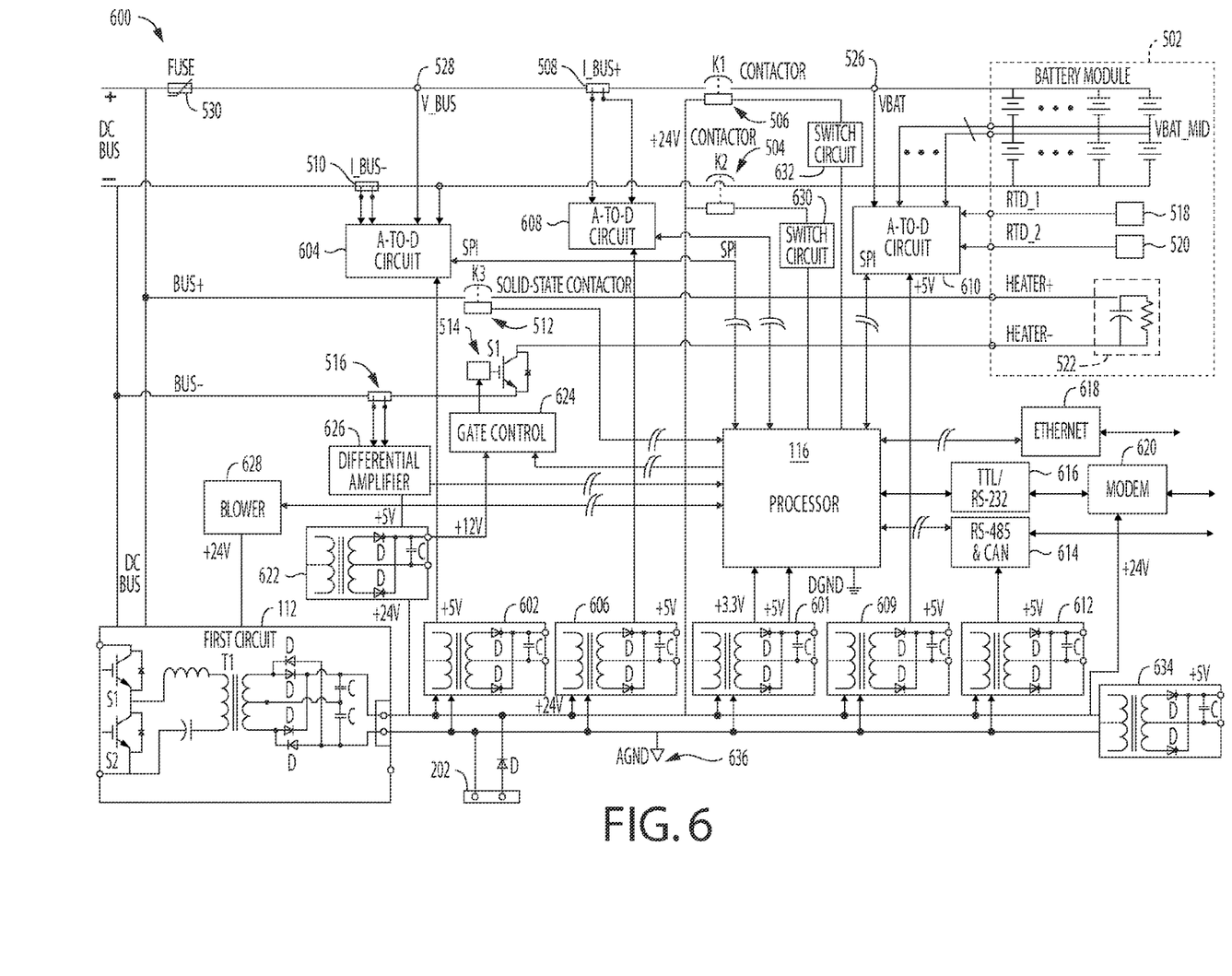
FIG. 6 is an illustration of an embodiment of a circuit for isolating low power circuitry of a battery management system.

Turning to FIG. 6, a system 600 is illustrated. The system includes the third circuit and the fourth circuit as numerous sub-circuits in comparison to the system 500 in FIG. 5. In an embodiment, additional isolation can be provided by providing at least one of the second circuit, the third circuit, or the fourth circuit into sub-circuits. For instance, the third circuit and/or the fourth circuit can be separated into a circuit 601, a circuit 602, a circuit 606, a circuit 609, a circuit 612, a circuit 622, a circuit 634, among others, wherein each circuit provides conditioning to a monitored signal and/or can share a ground 636.

The circuit 601 can convert and isolate the second voltage to the lower third voltage and/or additional voltage. In an embodiment, the circuit 601 can be substantially similar to the second circuit 114. For example, the third voltage can be approximately 3.3 volts and the additional voltage can be approximately 5 volts. The third voltage and/or the additional voltage can power at least one of the processor 116, a port 616 (e.g., TTL/RS-232), a port 618 (Ethernet port), among others. The processor 116 can communicate with at least one of the port 616, the port 618, a modem 620 (powered by the second voltage), among others.

The circuit 602 can convert and isolate the second voltage to the lower fourth voltage. The fourth voltage can power an A-to-D circuit 604, wherein the A-to-D circuit can receive at least one of a negative current bus signal from the DC bus via shunt 510, a positive polarity DC bus voltage signal, or a negative polarity DC bus voltage signal. The A-to-D circuit 604 can further receive a control signal from the processor 116 which is isolated via an optical coupler (illustrated as double curved lines that break a line in FIG. 6) in accordance with an embodiment.

The circuit 606 can convert and isolate the second voltage to the lower fifth voltage. The fifth voltage can power an A-to-D circuit 608, wherein the A-to-D circuit can receive at least one of a positive current bus signal from the DC bus via shunt 508. The A-to-D circuit 608 can further receive a control signal from the processor 116 which is isolated via an optical coupler (illustrated as double curved lines that break a line in FIG. 6) in accordance with an embodiment.

The circuit 609 can convert and isolate the second voltage to the lower fifth voltage. The fifth voltage can power an A-to-D circuit 610, wherein the A-to-D circuit can receive at least one of a mid-battery voltage signal for one or more batteries, a signal from the RTD 518, a signal from the RTD 520, a positive polarity voltage signal 526 from the battery module, among others. The A-to-D circuit 610 can further receive a control signal from the processor 116 which is isolated via an optical coupler (illustrated as double curved lines that break a line in FIG. 6) in accordance with an embodiment.

The circuit 612 can convert and isolate the second voltage to the lower third voltage to power a port such as, but not limited to RS-485, CAN, among others. The system 600 can further include a circuit 634 that can provide isolated power to additional ports, components, elements, and the like. The processor 116 can communicate with at least one of the port 614, the port 616, among others.

The circuit 622 can isolate and convert the second voltage to the lower fourth voltage, wherein the fourth voltage can be approximately 12 volts or 5 volts. The fourth voltage can power a differential amplifier 626 and/or a gate control 624. In an embodiment, the gate control can control the switch 514 via an isolated control signal from the processor 116. In an embodiment, the differential amplifier 626 can receive a signal from the shunt 516 to utilize with the switch 514, wherein the signal is used with the processor 116 for controlling the heater. The differential amplifier can be used to create a reference signal to facilitate controlling the heater.

The processor 116 can receive signals that are conditioned by various circuits in the system. Moreover, the processor can communicate control signals. The processor 116 can communicate control signals based upon one or more conditioned signals received via at least one of the third circuit, the fourth circuit, a sub-circuit of the third circuit, a sub-circuit of the fourth circuit, or a combination thereof In an embodiment, the processor can communicate a control signal related to a switch circuit 630 for the contactor 504. In another embodiment, the processor can communicate a control signal related to a switch circuit 632 for the contactor 506. Further, the system 600 includes a blower 628 that is controlled by the processor 116, wherein the blower is powered by the second voltage provided by the first circuit 112.

The aforementioned systems, circuits, components, and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In view of the exemplary devices and elements described supra, methodologies that may be implemented in accordance with the disclosed subject matter are described with reference to the flow chart of FIG. 7. The methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter. The methodologies can be implemented by a component or a portion of a component that includes at least a processor, a memory, and an instruction stored on the memory for the processor to execute.

Figure 7:
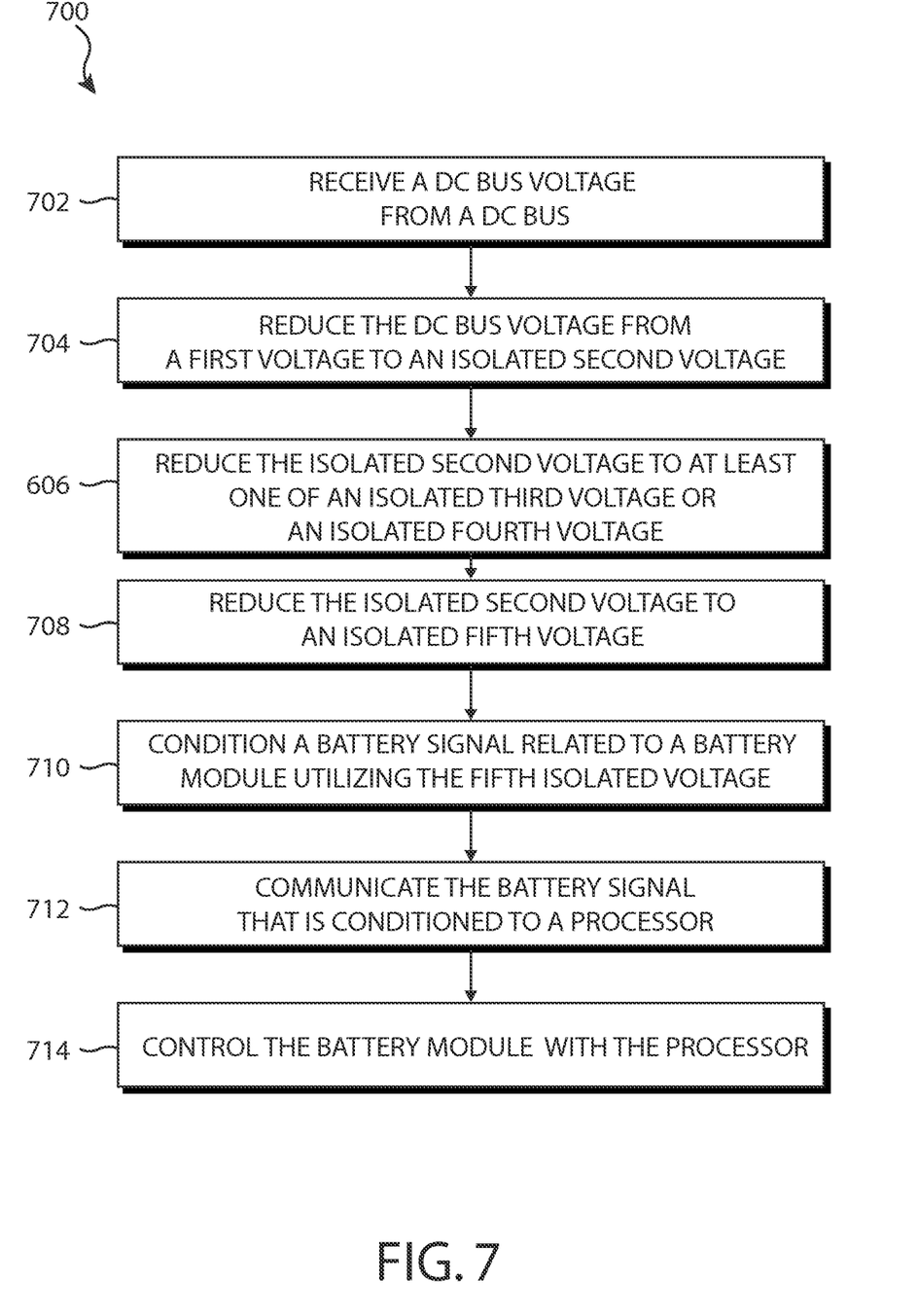
FIG. 7 illustrates a flow chart of an embodiment of a method for isolating low power circuitry of a battery management system.

FIG. 7 illustrates method 700 that isolates low power circuitry of a battery management system. At reference numeral 702, a DC bus voltage is received from a DC bus. At reference numeral 704, the DC bus voltage is reduced from a first voltage to an isolated second voltage. At reference numeral 706, the second voltage is reduced to at least one of an isolated third voltage or an isolated fourth voltage. At reference numeral 708, the second voltage is reduced to an isolated fifth voltage. At reference numeral 710, a monitored battery signal related to a battery module is conditioned to form a conditioned battery signal using the fifth voltage. At reference numeral 712, the conditioned battery signal is communicated to a processor. At reference numeral 714, an operation of the battery module is controlled with the processor in response to the conditioned battery signal. In an embodiment, means for communicating at least the first conditioned monitoring signal or the second conditioned monitoring signal to a processor of a battery management system. In an example, the means for communicating can be, but is not limited to, a bus, a wire, a wireless system, a communication bus, a component that communicates a signal, among others.

In an embodiment, the method can further include using the fourth voltage to power a port and using the third voltage to power the processor. In an embodiment, the port is at least one of a fan control, a Controller Area Network (CAN) box, an Ethernet port, a programming port, a communications port, a debug port, an RS-232 port, or an RS-485 port. In an embodiment, the first voltage is approximately 600 volts, the second voltage is approximately 24 volts, the third voltage is approximately 3.3 volts, the fourth voltage is approximately 5 volts, and the fifth voltage is approximately 5 volts. In an embodiment, the method can further include isolating a positive DC bus monitored current signal from a negative DC bus monitored current signal.

In an embodiment, the system can include a second circuit that is operatively connected to an output of the first circuit and configured to convert the second voltage to a lower third voltage and isolate the third voltage from the second voltage. In the embodiment, the processor is powered by the third voltage. In the embodiment, the third voltage is at least one of approximately 3.3 volts or approximately 5 volts. In the embodiment, the system can include a port that is powered by the third voltage. In the embodiment, the port is at least one of a fan control, a Controller Area Network (CAN) box, an Ethernet port, a programming port, a communications port, a debug port, an RS-232 port, or an RS-485 port.

In an embodiment, the system can include an auxiliary port that is configured to supply a sixth voltage to at least one of the second circuit, the third circuit, or the fourth circuit, wherein the sixth voltage is approximate to the second voltage. In an embodiment, the first voltage is approximately 600 volts. In the embodiment, the at least one of the second voltage or the sixth voltage is approximately 24 volts. In the embodiment, the at least one of the fourth voltage or the fifth voltage is approximately 5 volts.

In an embodiment, the first monitoring signal is at least one of a positive polarity DC bus voltage signal, a positive polarity battery voltage signal from the battery module, a mid-battery voltage signal from the battery module, a Resistance Temperature Detector (RTD) signal from the battery module, a battery heater shunt signal, a positive polarity contactor signal, or a negative polarity contactor signal. In an embodiment, the second monitoring signal is at least one of a positive polarity DC bus voltage signal, a positive polarity battery voltage signal from the battery module, a mid-battery voltage signal from the battery module, a Resistance Temperature Detector (RTD) signal from the battery module, a battery heater shunt signal, a positive polarity contactor signal, or a negative polarity contactor signal.

In an embodiment, the third circuit is associated with a negative side of the DC bus, the fourth circuit is associated with a positive side of the DC bus, the first monitoring signal is a monitored negative current bus signal from the DC bus, and the second monitoring signal is a monitored positive current bus signal from the DC bus. In an embodiment, the fourth voltage is at least one of approximately 12 volts or approximately 5 volts.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system, comprising:
   a first circuit configured to convert a first voltage of a DC bus to a lower second voltage and isolate the second voltage from the first voltage;
   a processor; and
   at least one of the following:
      a third circuit operatively connected to an output of the first circuit and configured to convert the second voltage to a lower fourth voltage, isolate the fourth voltage from the second voltage, and condition at least a first monitoring signal related to a battery module to form a first conditioned monitoring signal, wherein at least a signal conditioning portion of the third circuit is powered by the fourth voltage; or
      a fourth circuit operatively connected to the output of the first circuit and configured to convert the second voltage to a lower fifth voltage, isolate the fifth voltage from the second voltage, and condition at least a second monitoring signal related to the battery module to form a second conditioned monitoring signal, wherein at least a signal conditioning portion of the fourth circuit is powered by the fifth voltage;
   wherein the processor is configured to receive at least the first conditioned monitoring signal or the second conditioned monitoring signal.

2. The system of claim 1, further comprising a second circuit operatively connected to the output of the first circuit and configured to convert the second voltage to a lower third voltage and isolate the third voltage from the second voltage.

3. The system of claim 2, wherein the processor is powered by the third voltage.

4. The system of claim 2, wherein the third voltage is approximately 3.3 volts or approximately 5 volts.

5. The system of claim 2, further comprising a port that is powered by the third voltage.

6. The system of claim 5, wherein the port is at least one of a fan control, a Controller Area Network box, an Ethernet port, a programming port, a communications port, a debug port, an RS-232 port, or an RS-485 port.

7. The system of claim 1, further comprising an auxiliary port that is configured to supply a sixth voltage to the third circuit and the fourth circuit, wherein the sixth voltage is approximate the same as the second voltage.

8. The system of claim 1, wherein the first voltage is approximately 600 volts.

9. The system of claim 7, wherein at least one of the second voltage or the sixth voltage is approximately 24 volts.

10. The system of claim 1, wherein at least one of the fourth voltage or the fifth voltage is approximately 5 volts.

11. The system of claim 1, wherein the first monitoring signal is at least one of a positive polarity DC bus voltage signal, a positive polarity battery voltage signal from the battery module, a mid-battery voltage signal from the battery module, a Resistance Temperature Detector signal from the battery module, a battery heater shunt signal, a positive polarity contactor signal, or a negative polarity contactor signal.

12. The system of claim 1, wherein the second monitoring signal is at least one of a positive polarity DC bus voltage signal, a positive polarity battery voltage signal from the battery module, a mid-battery voltage signal from the battery module, a Resistance Temperature Detector signal from the battery module, a battery heater shunt signal, a positive polarity contactor signal, or a negative polarity contactor signal.

13. The system of claim 1, wherein:
   the third circuit is associated with a negative side of the DC bus;
   the fourth circuit is associated with a positive side of the DC bus;
   the first monitoring signal is a monitored negative current bus signal from the DC bus; and
   the second monitoring signal is a monitored positive current bus signal from the DC bus.

14. The system of claim 1, wherein the fourth voltage is approximately 12 volts or approximately 5 volts.

15. A method, comprising:
   receiving a DC bus voltage from a power grid;
   reducing the DC bus voltage from a first voltage to an isolated second voltage;
   reducing the second voltage to at least one of an isolated third voltage or an isolated fourth voltage;
   reducing the second voltage to an isolated fifth voltage;
   conditioning a monitored battery signal from a battery module to form a conditioned battery signal using the fifth voltage;
   communicating the conditioned battery signal to a processor; and
   controlling an operation of the battery module with the processor in response to the conditioned battery signal.

16. The method of claim 15, further comprising:
   using the third voltage to power the processor; and
   using the fourth voltage to power a port.

17. The method of claim 16, wherein the port is at least one of a fan control, a Controller Area Network box, an Ethernet port, a programming port, a communications port, a debug port, an RS-232 port, or an RS-485 port.

18. The method of claim 15, wherein the first voltage is approximately 600 volts, the second voltage is approximately 24 volts, the third voltage is approximately 3.3 volts, the fourth voltage is approximately 5 volts, and the fifth voltage is approximately 5 volts.

19. The method of claim 15, further comprising isolating a positive DC bus monitored current signal from a negative DC bus monitored current signal.

20. A system, comprising:
   a first circuit configured to convert a first voltage of a DC bus to a lower, isolated second voltage;
   at least one of the following:
      a third circuit operatively connected to an output of the first circuit and configured to convert the second voltage to a lower, isolated fourth voltage and to condition at least a first monitoring signal related to a battery module to form a first conditioned monitoring signal, wherein at least a signal conditioning portion of the third circuit is powered by the fourth voltage; or
      a fourth circuit operatively connected to the output of the first circuit and configured to convert the second voltage to a lower, isolated fifth voltage and to condition at least a second monitoring signal related to the battery module to form a second conditioned monitoring signal, wherein at least a signal conditioning portion of the fourth circuit is powered by the fifth voltage; and means for communicating at least the first conditioned monitoring signal or the second conditioned monitoring signal to a processor of a battery management system.

\* \* \* \* \*